Sept. 7, 1926. 1,598,823
M. L. JEFFREY ET AL
POWER TRANSMITTING MECHANISM
Filed July 23, 1923 5 Sheets-Sheet 2

Inventors
M. L. Jeffrey
W. T. Horton Jr.
Lloyd L. Evans
Attorney

By

Sept. 7, 1926.

M. L. JEFFREY ET AL 1,598,823

POWER TRANSMITTING MECHANISM

Filed July 23, 1923    5 Sheets-Sheet 3

Inventors
M. L. Jeffrey
W. T. Norton
Lloyd L. Evans
By
Attorney

Sept. 7, 1926.  M. L. JEFFREY ET AL  1,598,823.

POWER TRANSMITTING MECHANISM

Filed July 23, 1923  5 Sheets-Sheet 5

Inventors
M. L. Jeffrey
W. T. Norton Jr.
By Lloyd L. Evans
Attorney

Patented Sept. 7, 1926.

1,598,823

UNITED STATES PATENT OFFICE.

MAX L. JEFFREY AND WILLIAM T. NORTON, JR., OF CLEVELAND, OHIO, ASSIGNORS, BY MESNE ASSIGNMENTS, TO THE UNION TRUST COMPANY, A CORPORATION OF OHIO.

POWER-TRANSMITTING MECHANISM.

Application filed July 23, 1923. Serial No. 653,089.

This invention relates to motor vehicles and more particularly to the mechanism therefor.

One object of the invention is to provide an improved power transmitting mechanism capable of transmitting power to the drive wheel of the vehicle effectively and economically, and in which the proper speed reduction may be secured.

Another object of the invention is to provide mechanism of this character in which the differential elements and proper speed reducing elements are correlated and combined to transmit the power of the propeller shaft in a relatively efficient manner, and in which the construction and arrangement of the elements is simplified.

A further object of the invention is to provide a construction in which the housing members, differential and speed reducing elements may be readily assembled and disassembled and in which this may be accomplished independently of the relative adjustment of the bearings and speed reducing elements.

Still another object of the invention is to produce an axle construction in which the bearings and speed reducing gears may be adjusted at the factory and the axle may be inspected or taken apart and reassembled while in service without impairing such adjustment.

A further object of the invention is to provide a construction in which the differential and all of the speed reducing elements may be removed from the axle housing without disturbing the axle shaft sections and also in which such shaft sections may be removed or replaced without opening the housing or disturbing the speed reducing elements.

Other objects of the invention will be apparent to those skilled in the art to which my invention relates from the following description and annexed drawings, in which.

In the drawings, 1 indicates as an entirety that axle, preferably the rear axle, of a vehicle which may be propelled by a propeller shaft by suitable power, such as an internal combustion motor (not shown). The elements for transmitting power from the propeller shaft to the rear axle are preferably constructed and correlated to permit the axis of the driving element connected to the rear end of the propeller shaft to be arranged substantially in axial alinement with the crank shaft of the motor, whereby the latter said element and the elements constituting the propeller shaft may transmit the power from the motor with minimum friction losses.

Figure 1:
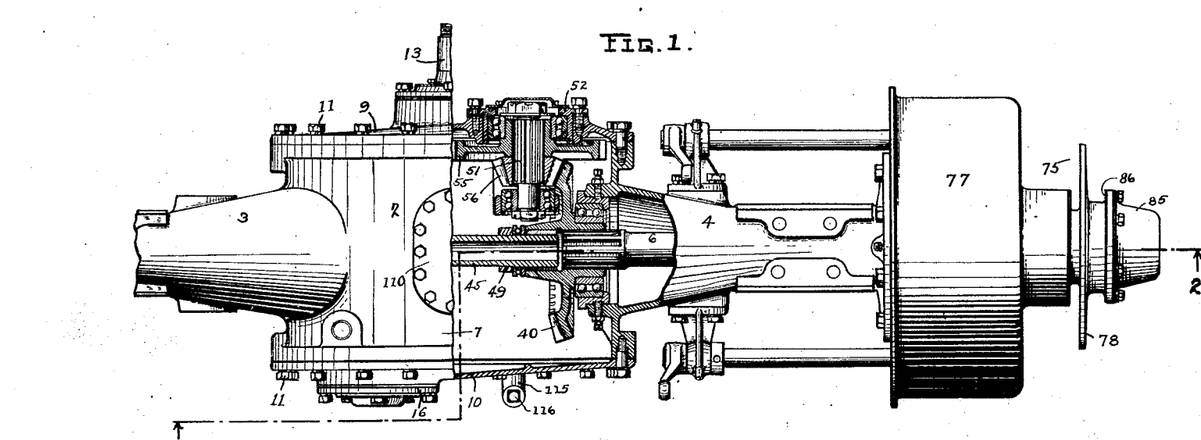
Figure 1 is a plan view, partly in section, showing the axle construction with part of the housing broken away.
Figure 2:
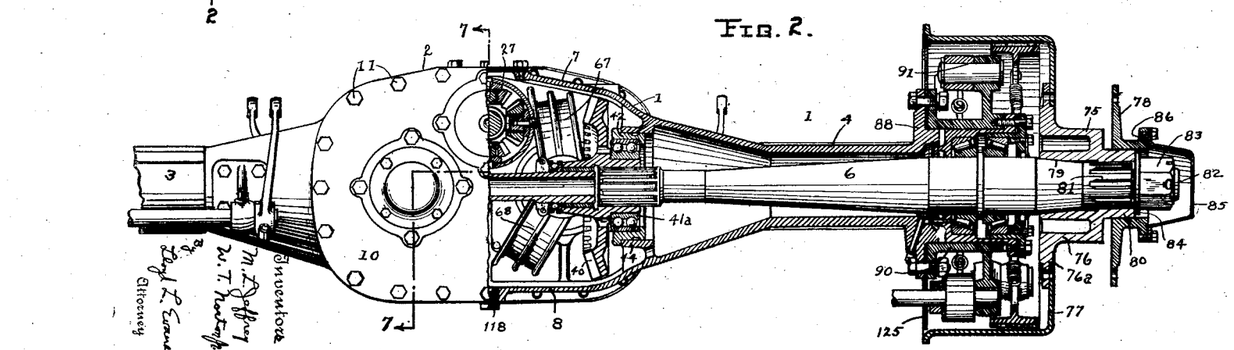
Fig. 2 is a view taken on the line 2—2, Fig. 1, showing half of the axle in section and the other part in elevation and partly broken away, the brake actuating mechanism being shown in a section rotated substantially 90° so that it will appear in this figure.

The axle 1 includes a housing which comprises a central portion 2 and a pair of tubular members 3 and 4, preferably integral therewith and which enclose the driven axle shafts or sections 5 and 6, the latter being connected to drive the wheels (the hubs of which are shown in Figs. 1 and 2). The tubular members 3 and 4 at their enlarged central portion form the sides, top 7 and bottom 8 of the housing member 2, leaving the front and rear open. To complete the housing, the front cover 9 and the rear cover 10, which are of substantially identical construction, are secured as by bolts 11 to the thickened portions of the members 7 and 8.

Of the power transmitting and speed reducing mechanism, 12 indicates a driving shaft which has a front end 13 adapted to be connected in any well known manner, but preferably by a universal joint, to a propeller shaft (not shown) to be driven thereby. The front or inner end of the driving shaft 12 extends through the opening 14ª in the removable closure 14, which is secured to the front plate 9 by suitable bolts engaging the thickened flange surrounding the opening 9'. The closure 14 has a suitable plate 14ᵇ secured thereto and surrounding the shaft 12 to engage suitable packing in the recess 14ᶜ to prevent leakage of lubricant along the shaft. In the rear cover 10 is an opening 10' closed by the closure 16 which may be fastened by any suitable means, such as bolts, to the thickened flange surrounding the opening 10'. The front and rear of the shaft 12 are suitably mounted in the bearings 17, 17', carried by the sleeves of the closures 14, 16, respectively. The bearings 17, 17' have a slip fit both with the closure members and the shaft for a purpose to be set forth. The outer races of the bearings 17, 17' are located in seats in the closures 14, 16, respectively, and the inner races engage the shaft.

Formed integrally with the shaft 12 are a plurality of studs 20, which extend radially therefrom and on which bevel pinions 21 are mounted for rotation, there being suitable bushings 22 interposed between the pinions and studs if desired. The bevel pinions are held in position in any suitable manner but preferably by an annular ring 23, there being spacing members 25 superposed between the outer faces of the bevel pinions and the ring. These spacing members have a relatively large contact with the substantially flat outer faces of the pinions to greatly reduce wear between them so that they do not often become loose. The spacers 25 are prevented from turning with the bevel pinions due to the flange 26 formed at one side of the ring and which engages the sides of the spacers.

Mounted on the driving shaft 12 is a differential mechanism indicated generally at 27. 28, 28' indicate differential bevel gears having hubs 29, 29', respectively, positioned on the driving shaft 12, and the gears 28, 28' mesh with the differential bevel pinions 21 and are rotated thereby relative to each other in the usual manner. The hubs 29, 29' are preferably of such length that their outer ends are contained within the closures 16, 14, there being suitable bearings 30, 30' interposed between their ends and the closures, the inner races of such bearings being preferably pressed upon the hubs and the outer races of the bearings slidably fitting the seats formed in the sleeves of the closures 14, 16 to receive them to permit easy removal of the closures. Inwardly of the bearings 30, 30' and preferably integral with the hubs 29, 29' are formed pinions 31, 31', preferably of the spur type, the purpose of which will be later described.

By mounting the bearings 30, 30' between the outer ends of the differential sleeves or hubs 29, 29' and the closures 14, 16 which form part of the housing when in position, it will be seen that no portion of the differential sleeves engage the driving shaft except where the differential bevel gears 28, 28' rotate on bushings mounted on the driving shaft. As the driving shaft is rigidly carried in the bearings 17, 17', any vibration thereof or any whip therefor will not be transmitted to the outer portions of the differential sleeves or hubs 29, 29', as such vibration will be taken up by the bearings 17, 17'. Also the thrust from the differential bevel gears is transmitted to the bearings 30, 30' and thence to the housing independently of the driving shaft.

The closures 14, 16 may be adjusted longitudinally with respect to the driving shaft 12 by the interposition of a suitable thickness of shims 27 between the outer flanges of the closures 14, 16 and the front and rear cover plates. By this means the differential gears can be adjusted with respect to the differential pinions. A convenient inspection opening with its closure 110 may be provided in the top of the housing 2 for inspection of the differential and its adjustment.

Figure 7:
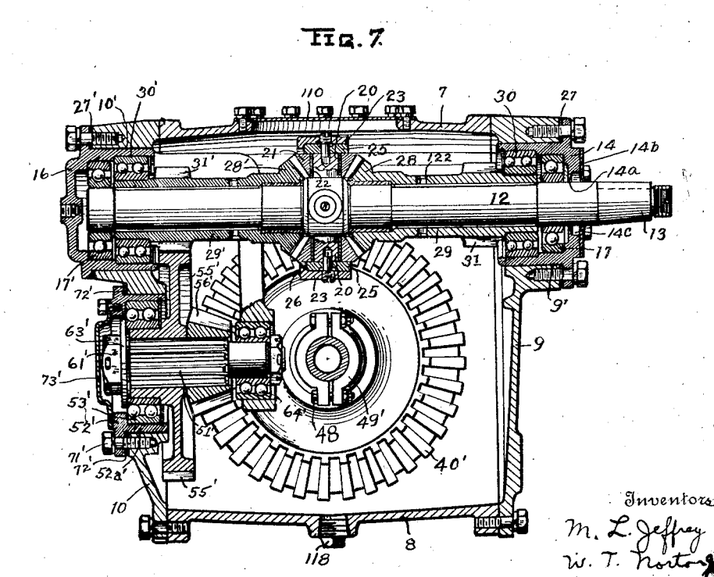
Fig. 7 is a vertical section on line 7—7, Fig. 2.

Mounted upon the inner ends of the driven axle sections 5, 6 in any desired manner, as by keying, are bevel gears 40, 40'. Each bevel gear has an outer hub portion 41 splined to slidingly receive the inner splined portion of an axle section and is shouldered on its exterior to form a seat for the inner race of the bearing 41ª which is preferably pressed thereon, the outer race of the bearing being received in a bearing cage 42 and extends as far as the outer shoulder 42ª of the cage. The inner flange 43 of the cage 42 engages the end of the inwardly extending annular flange 44 which is preferably formed integral with one of the tubular members 3 or 4 to receive the cage 42. The hub 41 of the bevel gear 40 extends inwardly to engage a tubular member 45, there being a bushing 46 interposed between the hub and tubular member to permit the bevel gear 40 to rotate relative to the tubular member, when one driven axle section rotates relative to the other. The tubular member, however, is free to rotate with both of the bevel gears when they are turning in the same direction. Inwardly of the hub of the gear 40 is disposed a suitable bearing 47, and the member 45 is threaded to receive a nut 49 to engage the bearing 47 and hold the same against the end of the hub. The bearing 47 prevents the transmission of rotary motion from the hub of the gear 40 to the nut 49, thereby preventing the nut from being rotated and loosened when the axle is in service. As a further precaution against turning, the nut 49 is preferably split and clamped together by bolts 48, as shown in Fig. 7.

The gears 40, 40' are thus alined and by tightening the nuts 49, 49', these gears are forced outwardly until the bearings 41$^a$, 41$^a{}'$ engage the shoulders 42, 42$^a{}'$ of the cages 42, 42'. The means for positioning and holding the gears 40, 40' is thus independent of the axle sections, and the axle sections can be inserted or removed from the hubs of the bevel gears without affecting the adjustment or position of such gears or without opening the axle housing.

The bevel gear 40' is mounted similar to the gear 40 just described and the primed reference numerals indicate on the drawing the similar parts.

Similarly, the covers 9 and 10 are substantially identical and the construction of only one will be described, the corresponding parts being indicated with reference numerals on the cover 9 and with primed reference numerals on the cover 10.

The cover 9 is preferably dished and reinforced with ribs 50 to strengthen the same and make it sufficiently rigid to carry the supporting member 51 with speed reducing elements thereon comprising a spur gear 55 and bevel pinion 56. While the supports 51, 51' are preferably shafts which rotate with the spur gear and bevel pinion which are suitably keyed thereto, it is to be understood that they can be fixed shafts or axles with the spur gear and bevel pinion suitably mounted for rotation together thereon.

Figure 11:
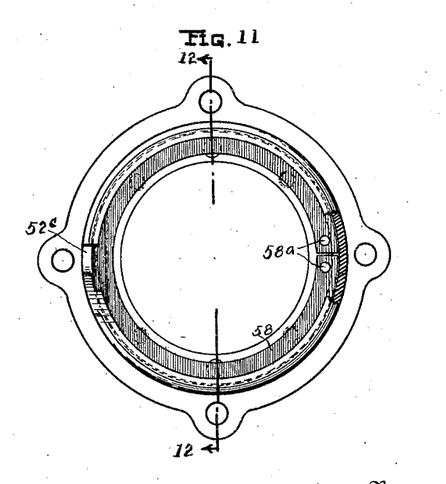
Fig. 11 is an elevation of the bearing cage for the short axle section showing the locking ring for holding the cage in position.
Figure 12:
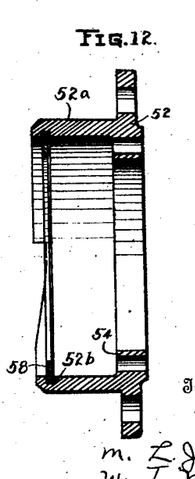
Fig. 12 is a vertical section of the cage on line 12—12, Fig. 11.

The outer end of the shaft 51 is carried by the closure 52 having an inwardly extending sleeve 52$^a$ and between the sleeve and the spur gear 55 is disposed a suitable bearing 53 which is seated in the sleeve and against the shoulder 54 and held therein by any suitable locking means, such as a flat ring 58, seated in a groove 52$^b$ in the sleeve 52$^a$. Preferably the flat ring 58 is a split ring having apertures 58$^a$ therein for receiving a suitable tool to rotate the ring in the groove 52$^b$ in the sleeve 52$^a$ so that the end of the ring will come opposite the opening 52$^c$ in the groove 52$^b$ as shown in Fig. 11.

The inner race of the bearing 53 engages the outer reduced portion of the hub 59 of gear 55, and is held against the shoulder 60 of said hub by a nut 61 engaging the threaded outer end 62 of the shaft 51, there being a suitable washer 63 interposed between the bolt and the bearing. A suitable bearing 64 is located upon the reduced inner end of the shaft 51 and held thereon by nut 65, there being a suitable washer 66 interposed between the bevel pinion 56 and the inner race of the bearing. The inner end of the shaft 51 and the bearing 64 mounted thereon are supported by rigid support arms 67, 68 secured to or preferably integral with the cover and terminating in an annular ring 69 to receive the bearing. The ring 69 may be flattened on one side, as at 70, for a purpose to be described. The closure 52 is secured to the cover 9 by any suitable means such as bolts 71, there being interposed shims 72 to secure the proper adjustment and location of the shaft 51 and its gears with respect to the other gearing. A small cap member 73 may be detachably secured to the closure 52 to permit access to the nut 61 of the shaft 51 and for inspection purposes.

Power is transmitted from the driving shaft 12 through the differential mechanism 27 and differential bevel gears 28, 28', respectively, to rotate them on the driving shaft. The bevel gears drive the spur pinions 31, 31', which in turn drive the spur gears 55, 55', and the latter through the shafts 51, 51' drive the bevel pinions 56, 56', which engage and drive the bevel gears 40, 40' to drive the axle shaft sections 5, 6 which carry the wheels.

The vehicle wheel hubs and their mounting are of similar construction and only one is shown and described. The wheel is indicated generally at 75 and may be constructed in any suitable manner, but preferably comprises a hub 76 to the inner flange of which may be secured a suitable brake drum 77. A suitable hub plate 78 is mounted on the reduced outer portion of the hub 75 and clamps a wheel structure (not shown) against the hub flange 76$^a$. The inner portion of the hub is preferably tapered, as at 79, to engage the correspondingly tapered portion of the axle section to center and locate the hub with respect to the axle and to provide a rigid engagement therewith for transmission of the load of the vehicle to the axle sections. The outer portions 80, 81 of the hub and axle section, respectively, are each grooved and splined for driving the wheel. The extreme outer end 82 of the axle section is threaded and carries a nut 83 with a suitable washer 84 interposed to hold the hub 75 securely on the axle section. Enclosing the bolt is a suitable hub cap 85 secured to the outer flange 86 of the hub plate 78.

Carried by the outer end of each tubular member 3, 4 of the axle housing is a sleeve 90 which is an extension of the housing and which serves as a support for the brake elements generally indicated at 91 to engage the brake drum 77 in the usual manner. While the sleeve 90 may be made integral with the housing member 4, it is preferable to have it separate and secure it in any suitable manner, as by means of flange 89 to the flange 88 of the member 4. A dust guard 125 may also be clamped between the flanges 88, 89 or secured to either one to protect the brake mechanism inside the brake drum.

Mounted on each axle section is a suitable bearing cage 92 in which are enclosed suitable bearings 93, 94 to take the load of the vehicle and which will take up thrusts from the wheels. A collar 95 is carried by the axle section and is preferably integral therewith. Against this collar the inner races of the bearings 93, 94 are abutted. The flange 92$^a$ forms the inner end of the cage 92 and engages the axle section and the outer race of the bearing 93 is pressed into the sleeve of the cage and abuts this flange. The cap or closure 96 for the cage is preferably cup-shaped and the sleeve 97 is enlarged at 98 to receive the outer race of the bearing 94 and to form a shoulder against which said bearing race may be abutted. Suitable shims 99 may be interposed between the outer flange 100 of the closure member 96 to provide the proper adjustment for the bearings. The closure is then secured in place to the cage 92 by short bolts 101 around the flange 100 and engaging the body of the cage. Tightening the bolts 101 draws the bearings 93 and 94 toward each other and snugly up against the collar 95 on the axle section and any desired adjustment may be obtained by the thickness of shims 99 interposed between the closure 96 and cage 92. Alternating with bolts 101 are long bolts 102 which pass through the flange 100 and hold the entire cage 92 against the sleeved casing 90 and positively locate the axle section.

Figure 8:
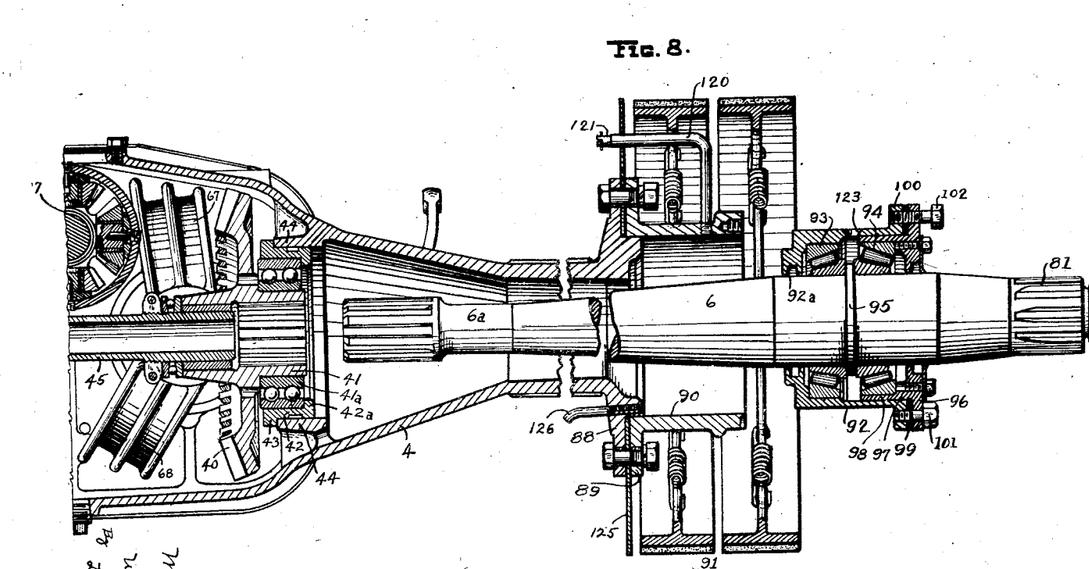
Fig. 8 is an enlarged vertical section similar to Fig. 2 with the axle shaft partially removed from the housing.
Figures 9, 10:
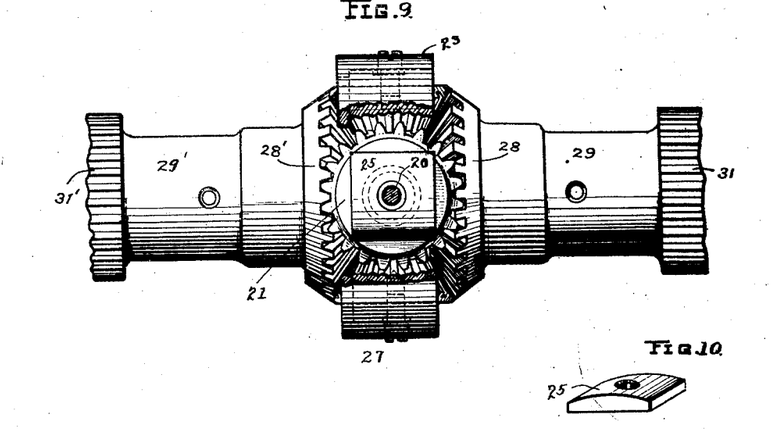
Fig. 9 is an enlarged view of the differential pinions and gears showing the ring and spacing members for holding the bevel pinions in place.
Fig. 10 is a perspective view of the spacing member.

Attention is called to the fact that our axle construction may be readily assembled and disassembled without impairing the adjustment of the bearings or parts, as will be more fully explained. As will be apparent from Figs. 2 and 8, the axle section can easily be removed by simply removing the hub cap 85 and the nut 83 at the end of the axle section and slipping off the wheel and brake drum. After this is accomplished, the alternate bolts 102 are withdrawn sufficiently to disengage them from the hub and the entire axle section with the bearings 93, 94 thereon may be disengaged by simply pulling the axle section outward and without in any way destroying or impairing the adjustment of the bearings with respect to the axle section or wheel as this is entirely controlled by the relation of the closure 96 to the cage 92 and the closure is held thereon by bolts 101 which need not be disturbed to remove the axle section. It is also to be noted that this is entirely independent of opening the central portion of the axle housing which can be left entirely intact for this operation.

Figure 3:
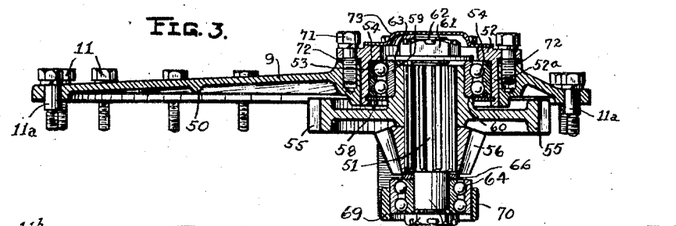
Fig. 3 is a horizontal section through one of the covers for the central housing.
Figure 4:
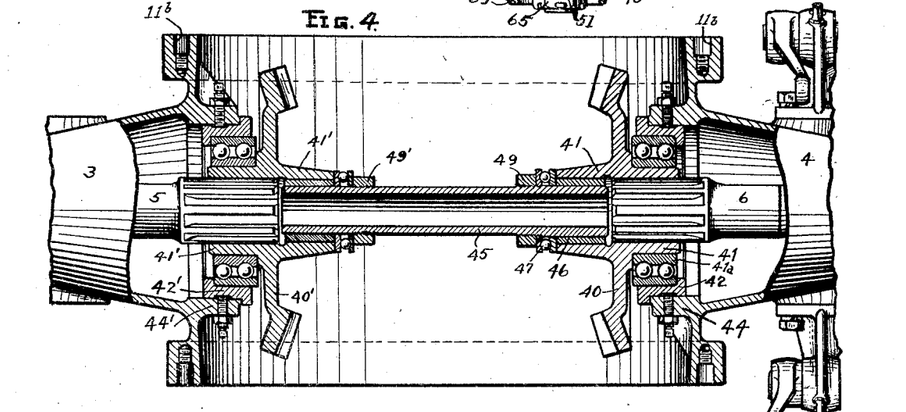
Fig. 4 is a horizontal section through the axle housing showing the axle shafts with the driving gears in section.
Figure 5:
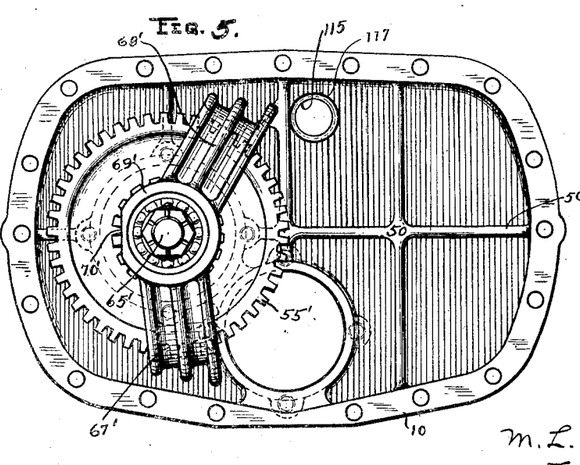
Fig. 5 is an inverted elevation of one of the covers of the central housing, the cover being positioned as if it had just been removed from the adjacent opening of the housing in Fig. 4 and turned back on its edge.

As shown in Figs. 3, 4 and 5, the front and rear covers 9, 10 may be removed from the center portion of the axle housing, carrying with them the short shaft sections 51, 51' with the speed reducing gears and bearings mounted thereon without disturbing their adjustment. In order to remove the cover 10, for example, with its assembly of gears and bearings, it is only necessary to remove the bolts 11 and then rotate the cover in its plane about the horizontal axis of the driving shaft as a center until the flattened portion 70 of the ring 69 has moved sufficiently to clear the teeth of the bevel gear 40', when the cover can be pulled directly away from the housing, or, if it be desired, the closure 16 may be removed by taking out the bolts 16$^b$ and inserting a suitable pulling tool in the threaded socket 16$^a$ provided for that purpose and pulling the sleeved closure member 16 outwardly. The bearing 17' engages both the driving shaft 12 and the cover 16 with a slip fit so that it is easily removed and the bearing 30' is pressed on the outer end of the hub 29' so that it remains there when the closure 16 is removed. With the bearing 17' removed, the cover 10 can be moved laterally sufficiently to the right in Fig. 4 after the bolts 16$^b$ are out, so that the flattened portion 70 of the annular ring 69 can pass the teeth of the bevel gear 40', when the cover can be axially removed. The lateral movement is possible because the removal of the bearings between the driving shaft 12 and the cover leaves an open space between them.

As shown in Figs. 3 and 4, in addition to the bolts 11 there is at each end of each of the covers 9 and 10 a combination dowel pin and bolt 11$^a$ to be received in the dowel pin apertures 11$^b$ in the housing. The apertures 11$^b$ preferably form the indexes for the machine work on the housing and for locating the covers. To secure the covers in place, the dowels 11$^a$ are first inserted and screwed up tight, thereby placing the cover with its gear mechanism in proper position relative to the bevel gears 40, 40', and the bolts 11 are then inserted to tightly hold the cover around its periphery.

It will be noted that when the cover 10 has been removed the short shaft section 51' with the gear elements 55', 56', their bearings and securing means, are removed without impairing the relative position or adjustment of the parts. Similarly, the cover 9, together with the shaft section 51 and its speed reducing elements and bearings may be slid back along the drive shaft 12 away from the housing or may be bodily removed with the drive shaft after the latter has been disconnected from the universal. It is obvious that since it is only necessary to remove a few bolts these covers can be readily removed from the housing and in a relatively short time.

Figure 6:
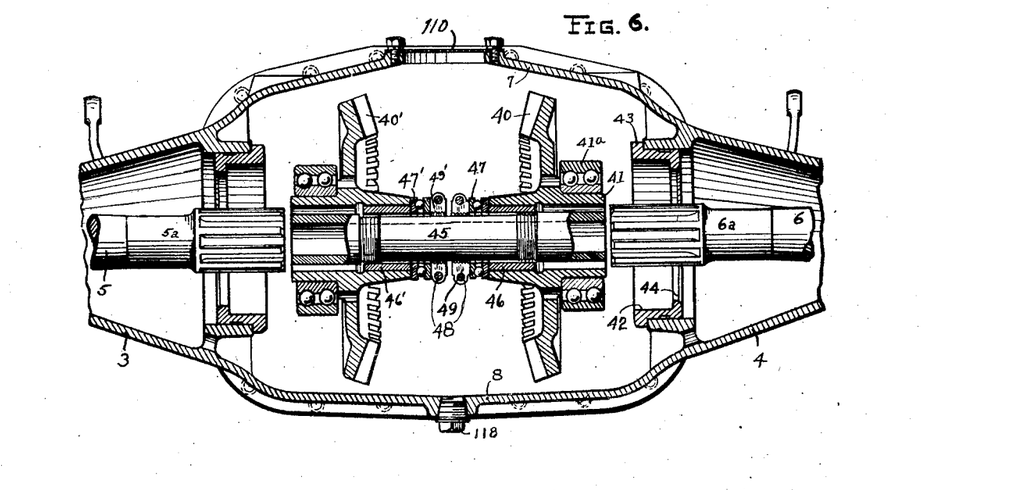
Fig. 6 is a vertical section of the housing with the covers removed and showing the large driving gears ready to be removed from the housing.

The bevel gears 40, 40', together with the tubular shaft 45, may be readily removed without in any way affecting or disturbing the axle shaft sections. This operation is accomplished by unscrewing clamping bolts 48 and unscrewing the nuts 49, 49', so that they move inwardly on the member 45, then sliding the bearings 47, 47' and gears 40, 40', together with the bearings 41ª, 41ª' which are pressed thereon inwardly. It will be noted, as shown in Fig. 6, that they may be slipped inwardly and sufficiently so that the outer ends of the hubs clear the inner ends of the axle shaft sections 5, 6, so that the entire assembly can be bodily removed from the center portion of the axle housing.

A suitable cup 115 having a cover 116 for receiving the lubricant is secured to the cover 10, enabling the oil to be introduced through the aperture 117 into the central housing. A drain plug 118 is provided at the bottom of the housing to drain the lubricant therefrom when desired.

In order to lubricate the axle sections, a suitable conduit 120 leading into the sleeve 90 and having an outer nipple 121 for the introduction of lubricant is provided. The bearing cage 92 has an aperture 123 which registers with the end of the conduit 120 to receive the lubricant. The drain pipe 126 is provided to allow any excess lubricant in the sleeve 90 to escape.

The minimum cross sectional area 5ª, 6ª of the axle sections, 5, 6 occur just outwardly from the inner splined portions of such axle sections.

Therefore, with our axle construction, should one of the axle sections be broken in service, the break will most likely occur at the portions 5ª or 6ª, or at least between the bearing cage 92 and the inner end of the axle section, and thus it will be seen that the vehicle can be towed to a desirable location for making repairs. Thus we have incorporated in our construction the advantages of the type of axle known as the full floating axle without necessitating the use of relatively large bearings and we also have avoided the disadvantages of being obliged to remove the axle shafts before removing the speed reducing gear mechanism.

It will also be seen that our driving pinions and gears are carried by driven shafts, each rigidly and independently supported at each end, which prevents twisting or distortion of the various shafts and disalinement of gears relative to their driving pinions.

It will also be noticed that in our construction the driving shaft and driven axle sections are in different planes and that the speed reducing mechanism is compactly arranged, so that it can be contained in a relatively compact housing which permits a relatively large road clearance. Also, the thrusts of the large bevel gears to drive the axle section are taken up by the bearings engaging such gears and are not transmitted to the axle sections. Furthermore, the heavy road thrusts are not transmitted to the speed reducing gearing but are taken up in the bearings between the axle section and the axle housing. Thus the differential mechanism is located so that it is subject only to relatively light strains such as the torque of the driving shaft.

In our axle construction it will be noticed that from the driving shaft the power is transmitted to the differential which is made up of pairs of units and from this point to the axle sections and wheels. The corresponding gears and bearings in the two trains of power transmission are of the same size and substantially identical, so that these parts are interchangeable, thus reducing the cost of manufacture, increasing the facility of assembly and having many other advantages well known to those skilled in this art.

Our construction of axle is also applicable to the type of vehicles wherein it is desirable to have the driving shaft beneath the axle sections, as in commercial passenger vehicles, such as busses and the like. For this kind of work it is only necessary to invert the present housing and substitute for the covers 9 and 10 covers which have the gear supports shifted to the other side of the same face of the cover and rotated 180° so that the flattened portion 70 of the ring projects outwardly as before. When so positioned, the bevel pinion 56' would drive the bevel gear 40 and the bevel pinion 56 would drive the bevel gear 40' to give a forward motion to the vehicle when the propeller shaft is rotating in the same direction as before.

When the axle is thus inverted, it is obvious that the major portion of the floor of such a vehicle can be made considerably lower than when the driving shaft is above the axle sections, and the driving shaft can be inclined upwardly from the housing and connected in the usual manner by a universal joint to the propeller shaft.

It will also be seen that by having the driving shaft extend from the forward part to the rear part of the housing, it may be extended through the rear to carry a drum for brake mechanism, or one or more additional axle units may be provided as in the case of commercial vehicles having four or more rear driving wheels.

Attention is also directed to the fact that with the construction herein disclosed and with the housing containing the usual amount of lubricant from the enlarged central chamber only the relatively slow moving bevel gears project downwardly sufficiently into the portion of the chamber to dip into the lubricant. This is of advantage as the viscosity of the lubricant increases the losses and cuts down the efficiency when the speed of the gears or the area of the gears contacting with the lubricant is increased.

The gears 40, 40' moving through the lubricant carry it up into the upper part of the housing to lubricate the differential mechanism. Lubricating apertures 122 are provided in the sleeves 29, 29' so that it will be carried along the driving shaft 12 to lubricate all parts thereof. However, if desired, a suitable means may be used to directly lubricate the differential from the lubricant in the housing.

It is to be understood that in this specification the terms "spur gear" and "bevel gear" are intended to include any type of gear to accomplish the purposes and they are not to be limited to the simple type indicated in the drawings.

From the foregoing description it will be seen that our power transmitting mechanism is relatively simple and provides for the driving of the wheels efficiently with considerable reduction and that the elements thereof may be relatively small to insure their easy manufacture, as well as to insure strength and durability.

Furthermore, it is to be understood that the particular forms of apparatus shown and described, and the particular procedure set forth, are presented for purposes of explanation and illustration and that various modifications of said apparatus and procedure can be made without departing from our invention as defined in the appended claims.

What we claim is:

1. The combination in a driving axle of a housing, a pair of driven axle sections arranged end to end therein, a driving shaft mounted in said housing at an angle to said driven axle sections, a differential mechanism and speed reducing gearing actuated by said driving shaft for driving said axle sections, said speed reducing gearing comprising gearing mounted on shafts carried by portions of the housing, said portions being removable from the main portion of the housing independently of the axle sections, and gears mounted on the inner ends of the axle sections and removable therefrom, whereby said speed reducing gearing is removable from said housing independently of said axle sections.

2. The combination in a driving axle of a housing, a pair of driven axle sections arranged end to end therein, a driving shaft mounted in said housing at an angle to said driven axle sections, a differential mechanism and speed reducing gearing in said housing and actuated by said driving shaft, independently supported shafts carried by portions of said housing and carrying said speed reduction gearing, said housing portions being separately formed and removably secured to the housing, whereby said shafts and housing portions are removable from the housing independently of the axle sections.

3. The combination in a driving axle of a housing, a pair of driven axle sections arranged end to end therein, a driving shaft mounted in said housing, a differential mechanism and speed reducing gearing actuated by said driving shaft and mounted in said housing and including gears on the inner ends of said axle sections, said gears having hubs, bearings mounted between said hubs and annular members carried by said housing, said gears and bearings being bodily removable from said housing independently of said axle sections.

4. The combination in a driving axle of a housing, a pair of driven axle sections arranged end to end therein, a driving shaft mounted in said housing at an angle to said driven axle sections, a differential mechanism mounted in said housing and actuated by said driving shaft, covers for said housing each comprising a dished, ribbed plate on which a shaft is carried for rotation, and speed reduction gearing mounted on said shafts to receive power from said differential mechanism and transmit it to said axle sections.

5. The combination in a driving axle of a housing, a driving shaft and a pair of driven axle sections therein, covers for said housing, said covers being of substantially identical construction and each comprising a plate having brace arms integral therewith, said plate and arms being adapted to rigidly support the ends of a shaft, and speed reducing gearing mounted on said shaft for transmitting power from said driving shaft to said axle sections.

6. The invention as claimed in claim 5 in which the covers, shafts and gearing are removably carried by said housing.

7. The combination in a driving axle of a housing, a driving shaft and a pair of driven axle sections therein, removable covers for said housing each comprising a plate on which a shaft is supported, speed reduction gearing mounted on said shafts to receive power from said driving shaft and transmit it to said axle sections, and gears mounted on the inner ends of said axle sections, said gears being removable from the axle sections inwardly, whereby said speed reduction gearing is bodily removable from the axle housing independently of said driven axle sections.

8. The combination in a driving axle of a housing, a pair of driven axle sections arranged end to end therein, a driving shaft mounted in said housing at an angle to said driven axle sections, a differential mechanism and speed reducing gearing mounted in said housing and actuated by said driving shaft, independently supported shafts carried by portions of said housing and carrying said speed reduction gearing, gears mounted to receive the inner ends of the axle sections and actuated by said gearing, a supporting member connecting said axle section gears, said shafts and housing portions being removable independently of said axle section gears and said supporting member, and said axle section gears being removable from said housing independently of said axle sections.

9. In a power transmitting mechanism the combination with a housing, of a driving shaft having differential mechanism mounted thereon, driven axle sections mounted therein and carrying wheels at their outer ends, gears mounted in said housing to drive said sections, front and rear covers for said housing, each of said covers being detachably secured to said housing and carrying a gear support, speed reducing elements mounted on said supports and disposed to receive power from said differential and transmit it to said gears.

10. In a power transmitting mechanism the combination with a housing, of a driving shaft having a differential mechanism mounted thereon, driven axle sections mounted therein and carrying wheels at their outer ends, gears mounted to drive said sections, front and rear covers for said housing, each of said covers being detachably secured to said housing and carrying a driven shaft, speed reducing elements mounted on said driven shafts and disposed to receive power from said differential and transmit it to said gears.

11. The combination in a driving axle of a housing, a pair of driven axle sections arranged end to end therein, a driving shaft mounted in said housing at an angle to said driven axle sections, a differential mechanism mounted on said driving shaft and actuated thereby, independently supported shafts mounted in said housing, each carrying a spur gear and bevel pinion, bevel gears connected to the inner ends of said axle sections and engaging with said bevel pinions, and spur pinions mounted on said driving shaft for engagement with said spur gears, said independently supported shafts being carried by removable covers for said housing.

12. The combination in a driving axle of a housing, a pair of driven axle sections arranged end to end therein, a driving shaft mounted in said housing at an angle to said driven axle sections, a differential mechanism mounted on said driving shaft and actuated thereby, shafts mounted in said housing and each rigidly supported at each end by a removable cover for said housing, gears connected to the inner ends of said axle sections, speed reducing elements mounted upon said independently supported shafts to be actuated by said differential mechanism and to actuate said gears.

13. The invention as claimed in claim 12 in which said independently mounted shafts may be adjusted relative to said gears independently of the removing or attaching of the closures to the housing.

14. The combination in a driving axle of a housing, a pair of driven axle sections arranged end to end therein, a driving shaft mounted in said housing at an angle to said driven axle sections, a differential mechanism mounted on said driving shaft and actuated thereby, removable dished covers to support said driving shaft, each of said removable covers carrying independent supports carrying speed reducing elements for rotation therewith to receive power from said differential mechanism and transmit it to said driven axle sections, said supports being supported at each end by said removable covers, whereby a rigid construction is obtained.

15. The combination in a driving axle of a housing, a pair of driven axle sections therein, a driving shaft mounted in said housing at an angle to said driven axle sections, a differential mechanism mounted on said driving shaft and actuated thereby, a pair of relatively short shafts supported by said housing for carrying speed reducing gearing, said shafts being disposed in a different plane from that of the driving shaft, each of said shafts being rigidly held at both ends from one side of the housing, gears mounted on the inner ends of said axle sections for engagement with said speed reducing gearing.

16. The combination in a driving axle of a housing, a pair of driven axle sections arranged therein, bevel gears mounted to drive said sections, a driving shaft mounted in said housing and carrying differential mechanism, a pair of independent supports carried by the housing, spur gears and bevel pinions mounted on said supports to rotate together, said spur gears meshing with said spur pinions and said bevel pinions meshing with said bevel gears.

17. The combination in a driving axle of a housing, a pair of driven axle sections arranged therein, bevel gears mounted to drive said sections, a driving shaft mounted in said housing and carrying differential mechanism, a pair of independent supports, each rigidly supported at both ends, spur gears and bevel pinions mounted on said supports to rotate together, said spur gears meshing with said spur pinions and said bevel pinions meshing with said bevel gears, each of said supports being carried by a removable side of the housing.

18. The combination in a driving axle of a housing, a pair of driven axle sections arranged therein, bevel gears mounted to drive said sections, a driving shaft mounted in said housing and carrying differential mechanism, a pair of independent supports carried by the housing and having their axes in the same plane, said plane being a different horizontal plane from that of the axis of the driving shaft, spur gears and bevel pinions mounted on said supports to rotate together, said spur gears meshing with said spur pinions and said bevel pinions meshing with said bevel gears.

19. The combination in a driving axle of a housing, a pair of driven axle sections arranged therein, bevel gears mounted to drive said sections, a driving shaft mounted in said housing and carrying differential mechanism, a pair of independent shafts each rigidly supported at both ends by one side of the housing, spur gears and bevel pinions mounted on said supports to rotate together, said spur gears meshing with said spur pinions and said bevel pinions meshing with said bevel gears.

20. The invention claimed in claim 19 in which said shafts have their axes in a different horizontal plane from that of the driving shaft.

21. The combination in a driving axle of a housing, a pair of driven axle sections arranged therein, gears mounted to drive said axle sections, a driving shaft mounted in said housing and carrying differential mechanism and pinions actuated thereby, a pair of independently mounted, rotatable shafts each carried by a removable cover for the housing, said shafts carrying gears to mesh with said pinions and pinions to mesh with said axle section gears.

22. The combination in a driving axle of a housing, a pair of driven axle sections arranged therein, gears mounted to drive said axle sections, a driving shaft mounted in said housing and carrying differential mechanism, pinions actuated thereby, a pair of rotatable shafts each supported at each end by a cover for said housing and having suitable bearings thereon, said shafts having their axes in a different horizontal plane from that of the driving shaft, and gears and pinions mounted on said shafts to rotate therewith, said gears meshing with said first mentioned pinions and said pinions meshing with said axle section gears.

23. The combination in a driving axle of a housing, a pair of driven axle sections arranged end to end therein, a driving shaft mounted in said housing at an angle to said driven axle sections, a differential mechanism mounted on said driving shaft and actuated thereby, gears mounted on the inner ends of said axle sections to rotate therewith and being slidable axially thereon, bearings mounted on the hubs of said gears and movable therewith, and a supporting member engageable with the inner ends of said hubs to receive said gears and bearings when they are moved inwardly toward each other sufficiently for the outer portions of said hubs to be disposed inwardly of the inner ends of said axle sections, whereby said bevel gears and supporting member may be bodily removed from said housing independently of said axle sections.

24. The combination in a driving axle of a housing, a pair of driven axle sections arranged end to end therein, gears mounted in said housing to receive the inner ends of said axle sections and to drive said sections, said gears being slidable relative to said sections, bearings between the hubs of said gears and said housing, means to removably force said gears outwardly to rigidly position them in said housing, and a driving shaft, differential mechanism and speed reducing gearing mounted in said housing to actuate said gears.

25. The combination in a driving axle of a housing, a pair of driven axle sections arranged end to end therein, bevel gears mounted in said housing to receive the inner ends of said axle sections and to drive said sections, said gears being slidable relative to said sections, bearings between the hubs of said gears and said housing, means to removably force said gears outwardly to rigidly position them in said housing, and a driving shaft, differential mechanism and speed reducing gearing mounted in said housing to actuate said bevel gears, whereby the thrusts from said gearing are not transmitted to the axle sections.

26. The combination in a driving axle of a housing, a pair of driven axle sections arranged end to end therein, a driving shaft mounted in said housing, a differential mechanism mounted on said driving shaft and actuated thereby, driving gears at the inner ends of said axle sections to rotate therewith, bearings mounted on the hubs of said gears and means independent of said axle sections for positioning and holding said gears in said housing, and speed reducing gearing actuated by said driving shaft to drive said gears.

27. The combination in a driving axle of a housing, a pair of driven axle sections therein, a driving shaft mounted in said housing at an angle thereto, the inner ends of said axle sections being slidably supported by driving gears carried by the housing, said gears having hubs, and bearings mounted between the hubs and housing, means independent of said axle sections for holding said gears in position in said housing, and speed reducing gearing actuated by said driving shaft to drive said gears.

28. The combination in a driving axle of a housing, a pair of driven axle sections therein, a driving shaft mounted in said housing at an angle thereto, the inner ends of said axle sections being slidably received by driving gears carried by the housing, means independent of said axle sections to rigidly position and hold each of said gears in driving position, said holding means being bodily removable with said gears from the axle housing independently of the axle sections, and speed reducing gearing actuated by said driving shaft to drive said gears.

29. The combination in a driving axle of a housing, a pair of driven axle sections therein, a driving shaft mounted in said housing at an angle thereto, the inner ends of said axle sections being slidably received by driving gears carried by the housing, means to aline and rigidly hold said gears in said housing in driving position, said holding means being bodily removable with said gears from the axle housing independently of the axle sections, and speed reducing gearing actuated by said driving shaft to receive said gears.

30. The combination in a driving axle of a housing, a pair of driven axle sections arranged therein, a driving shaft mounted in said housing and carrying a differential mechanism comprising differential pinions and differential gears, said differential gears having hubs surrounding said driving shaft, pinions carried by said hubs, the outer ends of said hubs being mounted in bearings carried by said housing and being out of contact with said driving shaft.

31. The combination in a driving axle of a housing, a pair of driven axle sections arranged end to end therein, a driving shaft mounted in said housing at an angle to said driven axle sections, a differential mechanism mounted on said driving shaft and actuated thereby, gears connected to the inner ends of said axle sections for rotation therewith, speed reducing elements independently supported by said housing to transmit power from said differential mechanism to said gears, said speed reducing elements and differential mechanism being carried by removable portions of the housing, whereby said speed reducing elements, said gears and said differential mechanism are removable from the housing independently of said axle sections.

In testimony whereof, we hereunto affix our signatures.

MAX L. JEFFREY.
WILLIAM T. NORTON, Jr.